(12) United States Patent
Patton et al.

(10) Patent No.: US 8,437,020 B2
(45) Date of Patent: May 7, 2013

(54) SYSTEM AND METHOD FOR PRINTER EMULATION

(75) Inventors: Ronnie Neil Patton, Lake Oswego, OR (US); Tanna Marie Richardson, Happy Valley, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 2306 days.

(21) Appl. No.: 10/845,438

(22) Filed: May 13, 2004

(65) Prior Publication Data

US 2005/0254078 A1 Nov. 17, 2005

(51) Int. Cl.
*G06F 3/12* (2006.01)
*G06K 15/00* (2006.01)

(52) U.S. Cl.
USPC .................. 358/1.15; 358/1.13; 358/1.14

(58) Field of Classification Search .................. 358/1.1, 358/1.12, 1.13, 1.14, 1.15, 1.16, 1.17, 296, 358/1.9, 1.2, 1.18, 3.28, 1.6; 400/62, 584, 400/76; 399/9; 707/4, 3; 345/601; 710/62; 715/770; 382/305
See application file for complete search history.

(56) References Cited

U.S. PATENT DOCUMENTS

| | | | | |
|---|---|---|---|---|
| 5,371,837 A | * | 12/1994 | Kimber et al. | 358/1.15 |
| 5,469,373 A | * | 11/1995 | Kashiwazaki et al. | 702/127 |
| 5,550,957 A | * | 8/1996 | Davidson et al. | 358/1.15 |
| 5,555,435 A | * | 9/1996 | Campbell et al. | 358/1.13 |
| 5,611,046 A | * | 3/1997 | Russell et al. | 358/1.16 |
| 5,615,015 A | * | 3/1997 | Krist et al. | 358/296 |
| 5,638,497 A | * | 6/1997 | Kimber et al. | 358/1.15 |
| 5,651,114 A | * | 7/1997 | Davidson, Jr. | 358/1.15 |
| 5,699,493 A | * | 12/1997 | Davidson et al. | 358/1.15 |
| 5,859,711 A | * | 1/1999 | Barry et al. | 358/296 |
| 5,899,614 A | * | 5/1999 | Maeda et al. | 400/62 |
| 5,903,716 A | * | 5/1999 | Kimber et al. | 358/1.13 |
| 5,905,906 A | * | 5/1999 | Goffinet et al. | 710/8 |
| 5,940,653 A | * | 8/1999 | Maekawa et al. | 399/9 |
| 6,025,925 A | * | 2/2000 | Davidson et al. | 358/1.14 |
| 6,027,268 A | * | 2/2000 | Bischel et al. | 400/584 |
| 6,091,508 A | * | 7/2000 | Love et al. | 358/1.15 |
| 6,151,598 A | * | 11/2000 | Shaw et al. | 707/3 |
| 6,160,629 A | * | 12/2000 | Tang et al. | 358/1.1 |

(Continued)

FOREIGN PATENT DOCUMENTS

| JP | 05-131726 | 5/1993 |
|---|---|---|
| JP | 5131726 | 5/1993 |

(Continued)

*Primary Examiner* — Twyler Haskins
*Assistant Examiner* — Jonathan Beckley
(74) *Attorney, Agent, or Firm* — Law Office of Gerald Maliszewski; Gerald Maliszewski

(57) ABSTRACT

A system and method are provided for selectively emulating printer job processes. The method comprises: receiving a print job from a source; determining a match between received print job commands and default print job commands; mapping non-matching received print job commands to default print job commands; and, printing the print job using an modified set of received print job commands. The job may be printed using a combination of mapped default and received print job commands. The match between received print job commands and default print job commands may be determined by identifying a source print driver identity. The source print driver can be identified in response to parsing PJL commands received with the print job. Then, the method selects a table in response to determining the source print driver identity and accesses the selected table for default print job commands that have been cross-referenced to received print job commands.

30 Claims, 5 Drawing Sheets

U.S. PATENT DOCUMENTS

| | | | |
|---|---|---|---|
| 6,173,338 B1 * | 1/2001 | Fukuta | 358/1.17 |
| 6,249,835 B1 * | 6/2001 | Isoda | 358/1.15 |
| 6,290,406 B1 * | 9/2001 | Gauthier et al. | 400/76 |
| 6,349,297 B1 * | 2/2002 | Shaw et al. | 707/4 |
| 6,496,279 B2 * | 12/2002 | Kuroi | 358/1.9 |
| 6,603,565 B1 * | 8/2003 | Scheidig et al. | 358/1.13 |
| 6,665,081 B1 * | 12/2003 | Suzuki et al. | 358/1.13 |
| 6,680,740 B2 * | 1/2004 | Krueger | 345/601 |
| 6,701,384 B1 * | 3/2004 | Fukuta | 710/5 |
| 6,717,689 B1 * | 4/2004 | Endo et al. | 358/1.2 |
| 6,757,070 B1 * | 6/2004 | Lin et al. | 358/1.1 |
| 6,775,019 B1 * | 8/2004 | Sakurai et al. | 358/1.15 |
| 6,804,022 B2 * | 10/2004 | Fujiwara et al. | 358/1.15 |
| 6,825,941 B1 * | 11/2004 | Nguyen et al. | 358/1.15 |
| 6,831,753 B1 * | 12/2004 | Tsuchitoi | 358/1.14 |
| 6,903,832 B2 * | 6/2005 | Maekawa et al. | 358/1.14 |
| 6,914,687 B1 * | 7/2005 | Hosoda et al. | 358/1.1 |
| 6,924,826 B1 * | 8/2005 | Nakagiri et al. | 715/700 |
| 6,927,873 B2 * | 8/2005 | Isoda et al. | 358/1.15 |
| 6,934,046 B1 * | 8/2005 | Nishikawa et al. | 358/1.15 |
| 6,943,905 B2 * | 9/2005 | Ferlitsch | 358/1.13 |
| 6,963,412 B1 * | 11/2005 | Toda | 358/1.13 |
| 6,965,404 B2 * | 11/2005 | Hosoda et al. | 348/231.6 |
| 6,965,953 B2 * | 11/2005 | Kujirai | 710/62 |
| 6,967,742 B1 * | 11/2005 | Nagashima | 358/1.9 |
| 6,992,784 B1 * | 1/2006 | Kohtani et al. | 358/1.15 |
| 7,027,170 B1 * | 4/2006 | Nishikawa et al. | 358/1.15 |
| 7,054,018 B1 * | 5/2006 | Sugiura et al. | 358/1.15 |
| 7,054,899 B1 * | 5/2006 | Yamamoto | 358/1.13 |
| 7,064,849 B1 * | 6/2006 | Nishikawa et al. | 358/1.15 |
| 7,064,856 B2 * | 6/2006 | Fu et al. | 358/1.18 |
| 7,095,529 B2 * | 8/2006 | Krueger et al. | 358/1.9 |
| 7,161,710 B1 * | 1/2007 | MacLeod | 358/1.9 |
| 7,167,253 B2 * | 1/2007 | Endoh et al. | 358/1.14 |
| 7,170,619 B2 * | 1/2007 | Miyata | 358/1.15 |
| 7,202,968 B2 * | 4/2007 | Uchida | 358/1.18 |
| 7,218,404 B2 * | 5/2007 | Tsuchitoi | 358/1.13 |
| 7,230,729 B1 * | 6/2007 | Reardon et al. | 358/1.13 |
| 7,233,404 B2 * | 6/2007 | Meilstrup et al. | 358/1.13 |
| 7,251,052 B2 * | 7/2007 | Ferlitsch | 358/1.6 |
| 7,253,911 B2 * | 8/2007 | Aritomi | 358/1.13 |
| 7,265,877 B2 * | 9/2007 | Silverbrook et al. | 358/3.28 |
| 7,268,897 B1 * | 9/2007 | Moro et al. | 358/1.13 |
| 7,280,245 B2 * | 10/2007 | Nishikawa et al. | 358/1.15 |
| 7,286,250 B2 * | 10/2007 | Kujirai et al. | 358/1.15 |
| 7,299,413 B2 * | 11/2007 | Mori | 715/770 |
| 7,301,656 B1 * | 11/2007 | Nakagiri et al. | 358/1.15 |
| 7,305,150 B2 * | 12/2007 | Shibahara et al. | 382/305 |
| 7,450,260 B2 * | 11/2008 | Takeda et al. | 358/1.15 |
| 2003/0184782 A1 * | 10/2003 | Perkins et al. | 358/1.13 |
| 2004/0184064 A1 * | 9/2004 | TaKeda et al. | 358/1.13 |
| 2005/0254078 A1 * | 11/2005 | Patton et al. | 358/1.13 |
| 2008/0165379 A1 * | 7/2008 | Zuber | 358/1.9 |

FOREIGN PATENT DOCUMENTS

| | | |
|---|---|---|
| JP | 07-129343 | 5/1995 |
| JP | 7129343 | 5/1995 |
| JP | 07-210341 | 8/1995 |
| JP | 07-223341 | 8/1995 |
| JP | 7210341 | 8/1995 |
| JP | 7223341 | 8/1995 |
| JP | 8152985 | 6/1996 |
| JP | 08-185925 | 7/1996 |
| JP | 8185295 | 7/1996 |
| JP | 08-249138 | 9/1996 |
| JP | 8249138 | 9/1996 |
| JP | 09-188010 | 7/1997 |
| JP | 9185468 | 7/1997 |
| JP | 9188010 | 7/1997 |
| JP | 2002-055792 | 2/2002 |
| JP | 20020055792 | 2/2002 |
| JP | 2003005931 | 1/2003 |
| JP | 2004-086460 | 3/2004 |
| JP | 2004086460 | 3/2004 |

* cited by examiner

Original Shipping Configuration

User-Programmed Mapping Table

| Tray Requested in Print Job | Tray Used |
|---|---|
| 1 | 2 |
| 2 | 3 |
| 3 | 4 |
| 4 | 1 |

Sample Print Job

| Sharp Command | HP Command |
|---|---|
| Input Tray 1 | Input Tray 2 |
| Input Tray 2 | Input Tray 3 |
| Input Tray 3 | Input Tray 4 |
| Bypass Tray | Input Tray 1 |
| @PJL JOBSTAPLE=STAPLENO | @PJL FINISH=NONE |
| @PJL JOBSTAPLE=STAPLELEFT | @PJL FINISH=STAPLE |

Fig. 3

SYSTEM AND METHOD FOR PRINTER EMULATION

BACKGROUND OF THE INVENTION

1. Field of the Invention

This invention generally relates to digital document processing and, more particularly, to a system and method for emulating the processing performance of one printer in a different printer.

2. Description of the Related Art

As printers have evolved, the print streams generated for one manufacturer's printers have become somewhat incompatible with the printers of other manufacturers. The basic data can be output because all printers use standard page description languages (PDLs), such as printer control language (PCL) or PostScript (PS). However, the manner of outputting the data, for example the finishing options, may vary from one printer to the next. These variances between manufactures have occurred for several reasons. First, all print manufacturers support a common set of basic PJL (printer job language) commands for controlling settings like number of copies and page size. However, as advanced or unique features have been added, manufacturers have created their own PJL command to call the new feature. Manufacturers implementing similar features in the same timeframe may deliberately or inadvertently choose different commands to call the features and, therefore, create incompatibilities.

Another major incompatibility is in the numbering scheme for paper trays. Copier manufacturers conventionally number the paper cassettes 1 through n, from top to bottom, and refer to the bypass tray by name. Printer manufacturers, on the other hand, conventionally refer to the bypass tray as tray 1, and the cassettes 2 through n, from top to bottom. As copier manufacturers have added print controllers and printing capabilities to their copiers, they have maintained their conventional numbering scheme, creating an incompatibility between copier-based devices and standalone printers.

In most general office environments, these incompatibilities do not create a problem because customers use vendor-supplied print drivers to generate print jobs. These print drivers provide user-friendly graphical selections for print settings and then convert the selections into the vendor-specific commands. However, many legacy and industry-specific software applications are written with print drivers built-in and hard-coded to specific printers. Customers using these applications, or those customers who wish to standardize their network around a single print driver, find it difficult to switch vendors, because their print jobs do not generate the same output on other vendors' devices. In addition, some customers use a driver to generate print-ready files, such as *.prn format files. PJL commands are contained in the print stream and can generate compatibility problems.

FIG. 1 is a drawing depicting a system that addresses a single aspect of the printer incompatibility problem (prior art). More specifically, the paper tray numbering issue is addressed, but incompletely solved, by creating a table in the printer that maps incoming tray requests to various assigned trays, see U.S. Pat. No. 6,027,268. For example, a printer may ship with the bypass labeled as tray 1, and the paper drawers labeled 2 through 4, from top to bottom. The invention permits a user to reprogram the printer to map incoming requests for tray 1 to the printer's tray 2, and so forth. However, this patent is not a complete solution to the problem, because it does not address other incompatibilities in the print job. Further, it incompletely solves the tray problem because all subsequent print jobs sent to the device use this new mapping. Alternately stated, the printer must be reprogrammed every time the print driver is changed. The patent does not solve the problem for environments that require multiple tray mappings, depending on how the job is generated. For example, the patent does not address an environment using both a legacy application and a vendor-supplied print driver.

It would be advantageous if a document could be rendered as the user intended, complete with the intended finishing options, regardless of the printer to which a print job is directed.

It would be advantageous if a printer could modify print commands in response to print driver source, to process a document as the user intended.

SUMMARY OF THE INVENTION

The present invention discloses a table in the printer firmware, either built-in or user-programmed, that permits print commands generated for one device, to be mapped to the internal commands for the actual target device. One or more tables may exist for mapping multiple devices. For example, a different table may exist for every manufacturer or model.

Once the table is created, the present invention provides a mechanism for automatically detecting the intended printer brand or model, and emulating the intended printer using the settings in the table. The intended printer type is determined from clues in the print job, such as a PJL command that identify the manufacturer and model associated with the print driver, or even the lack of such a command. For example, a Sharp printer may receive a job that does not identify Sharp as the generator of the job. In response, the printer uses a compatibility table that emulates an alternate, non-Sharp printer.

Accordingly, a method is provided for selectively emulating printer job processes. The method comprises: receiving an electronically formatted print job from a source; determining a match between received print job commands and default print job commands; mapping non-matching received print job commands to default print job commands; and, printing the print job using a modified set of received print job commands. For example, the job may be printed using a combination of mapped default and received print job commands.

In one aspect, the match between received print job commands and default print job commands is determined by identifying a source print driver identity. For example, the source print driver can be identified in response to parsing PJL commands included with received print job commands. Then, the method selects a table in response to determining the source print driver identity and accesses the selected table for default print job commands that have been cross-referenced to received print job commands.

The default print job commands in the table may include commands concerning input tray number selection, output tray number selection, finishing options, such as staple, punch, binding edge, or pamphlet, inserts for transparencies and a carbon copy function, or print hold, controlled by a PIN or other proof.

Additional details of the above-described method and a printer job emulation system are provided below.

BRIEF DESCRIPTION OF THE DRAWINGS

FIG. 3 is a drawing depicting an exemplary compatibility table.

DETAILED DESCRIPTION OF THE PREFERRED EMBODIMENTS

Figure 1:
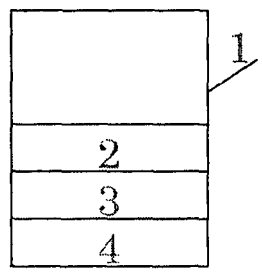
FIG. 1 is a drawing depicting a system that addresses a single aspect of the printer incompatibility problem (prior art).
Figure 1:
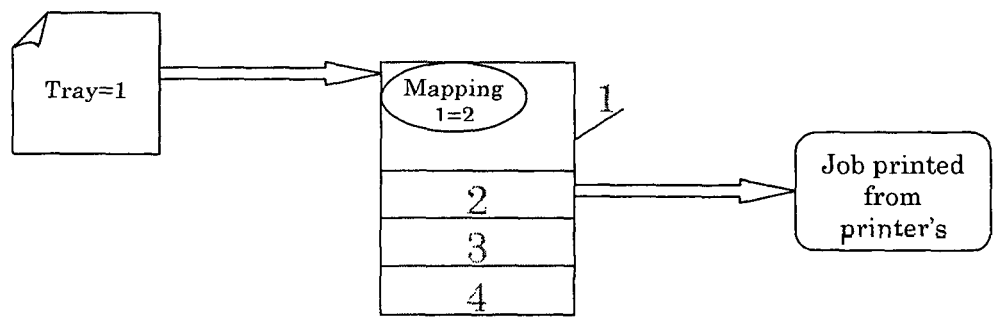
Figure 2:
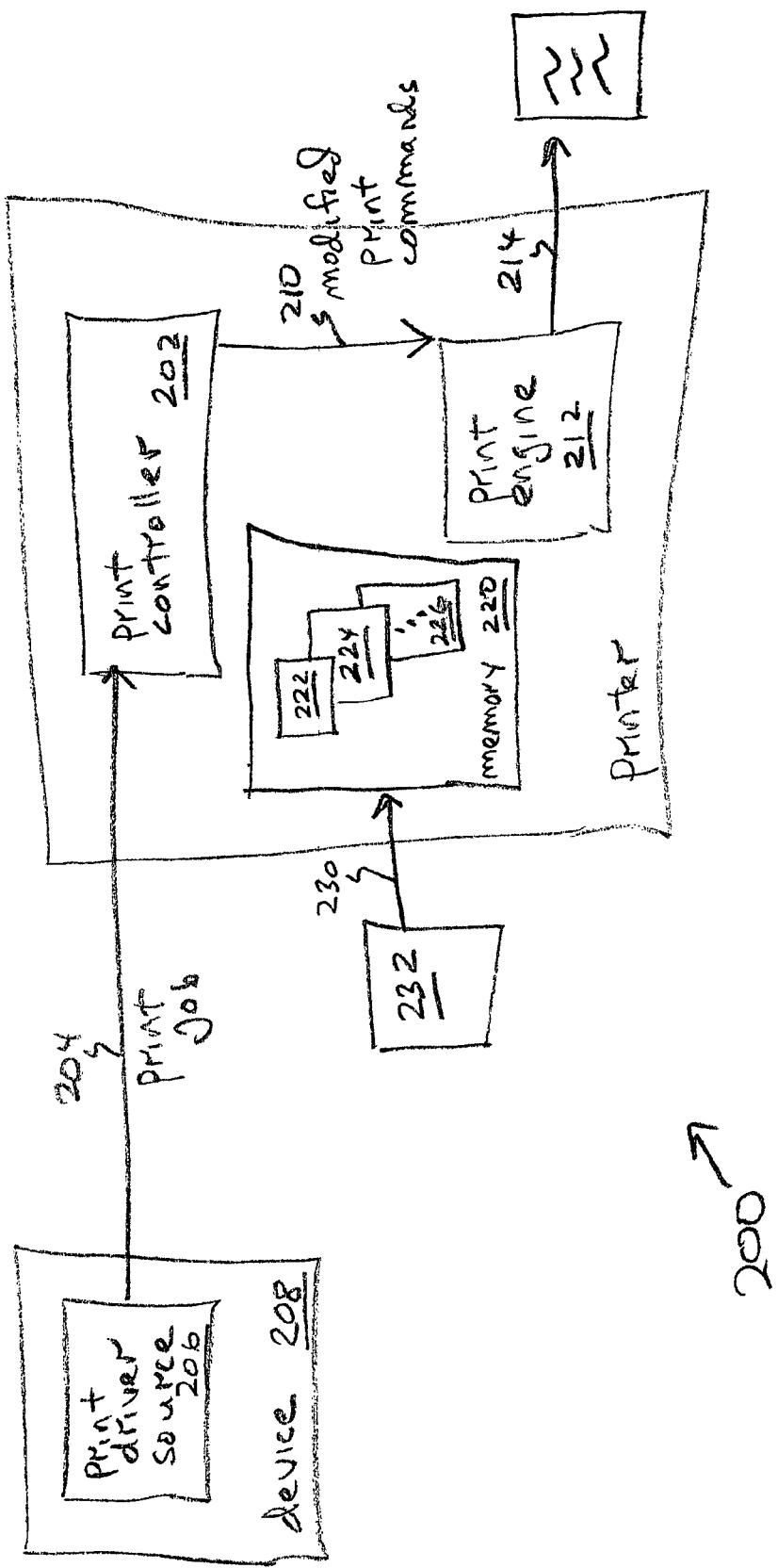
FIG. 2 is a schematic block diagram of the present invention printer job emulation system.

FIG. 2 is a schematic block diagram of the present invention printer job emulation system. The system 200 comprises a print controller 202 having an interface on line 204 to receive an electronically formatted print job from a source 206. Here, the source 206 is depicted as print driver embedded in a device 208, such as a personal computer or print server. Line 204 may represent a local connection, such as a USB, serial, and parallel port cable connection, or network connection, such as a local area network (LAN) and Internet connection to name a few examples. The controller 202 determines a match between received print job commands and default print job commands, and maps non-matching received print job commands to default print job commands.

The print controller 202 has an output on line 210 to supply a modified set of received print job commands. A print engine 212 has an input on line 210 to receive the modified print job commands and an output on line 214 to supply a printed document responsive to the print job commands. The print controller 202 supplies a combination of mapped default and received print job commands to the print engine 212. That is, the print engine 212 may print a first portion of the print job using received print job commands, and a second portion of the print job using mapped default print job commands.

The print controller 202 receives print job commands in a language such as printer job language (PJL) or page description language (PDL). As noted above, the PS, associated with Adobe, and PCL, associated with Hewlett Packard, languages are specific types of PDL. Note, a typical print job may include both PJL and PDL commands. It should be noted, however, that the present invention is not limited to any particular languages, protocol, or formats.

In one aspect, the print controller 202 determines the match between received print job commands and default print job commands in response to identifying a source print driver 206. For example, the print controller 202 may identify a source print driver in response to parsing a print driver source command in the received PJL commands.

In another aspect, the system 200 further comprises an accessible memory 220 including at least one table 222 cross-referencing received print job commands to default print job commands. The print controller 202 selects the table 222 in response to determining the source print driver identity. Then, the print controller 202 maps non-matching received print job commands to default print job commands in response to accessing the selected table.

For example, the print controller 202 may parse a PJL command that identifies a first print driver, for example an HP printer, and selects a first table from the memory corresponding to the first print driver. In another aspect, the print controller 202 identifies the first print driver by parsing a manufacturer-specific identifier in the received PJL commands. In a different aspect, the print controller 202 identifies the first print driver by parsing a model-specific identifier in the received PJL commands.

In another aspect of the system 200, the memory 220 includes a plurality of tables corresponding to a plurality of print drivers. Shown are tables 222 through 226. However, it should be understood that the present invention is not limited to any particular number of tables. Then, the print controller 202 parses a PJL command that identifies a first print driver from among a plurality of print drivers, and selects a first table in memory 220, for example table 222, corresponding to the first print driver, from among the plurality of tables 222-226.

In a different aspect, the print controller 202 may fail to parse a PJL command that identifies a particular print driver, and select the second table 224 from memory 220 in response to failing to identify a particular print driver. For example, if the PJL commands fail to identify a particular print driver, the assumption may be made (by a Sharp printer) that the source print driver 206 is a HP print driver. Then, a table 224 is selected that corresponds to an HP print driver.

In another aspect, the print controller 202 parses a PJL command that identifies a third print driver and supplies unmodified received print job commands to the print engine 212 in response to identifying the third print driver. For example, a Sharp printer may identify the print driver as a Sharp print driver. Then, the print job commands can be delivered to the print engine 212 without any modifications.

FIG. 3 is a drawing depicting an exemplary compatibility table. The print controller may map print job commands associated with input tray number selection, output tray number selection, finishing options, such as staple, punch, binding edge, or pamphlet, inserts for transparencies and carbon copy function, or print hold for PIN and proof printing. Other commands are also possible. The exemplary table depicts the mapping of input tray selection and staple finishing options between a Sharp and an HP printer. Additionally, other tables (not shown) may be used to map between different model printers made by the same manufacturer, between the same model printer when enabled with different hardware options, or between the same model printer when enabled for different networking, human language, or custom configuration options.

Returning to FIG. 2, in one aspect the memory 220 has an interface on line 230 for accepting and storing a generated table, such as table 232, that cross-references print job commands associated with a first source print driver, to default print job commands. In a different aspect, the memory replaces a previously stored table with the accepted table. For example, the memory 220 replaces table 222 with table 232. This aspect of the invention permits a user to replace outdated tables, or to update tables with custom modifications.

Functional Description

In one aspect of the invention, a table is built-in to the device firmware to map the between the print commands of different manufacturers. These commands may include, but are not limited to, input tray numbers, output tray numbers, and PJL commands. Since many applications are hard-coded to print on HP printers, this mapping table will permit a new printer to work with a customer's existing application.

As a new print job is being received, the printer interprets the print stream and determines the print job origin by parsing through PJL commands. If PJL commands indicate that a job is created by a Sharp printer driver, a Sharp printer executes the job using standard methods. If a PJL command indicates that another vendor's print driver created the file, or if no PJL command exists and another vendor's print driver is assumed, the print job is output using a mapping table. The printer firmware compares each command in the print job to the table to determine if a change is necessary.

Figure 4:
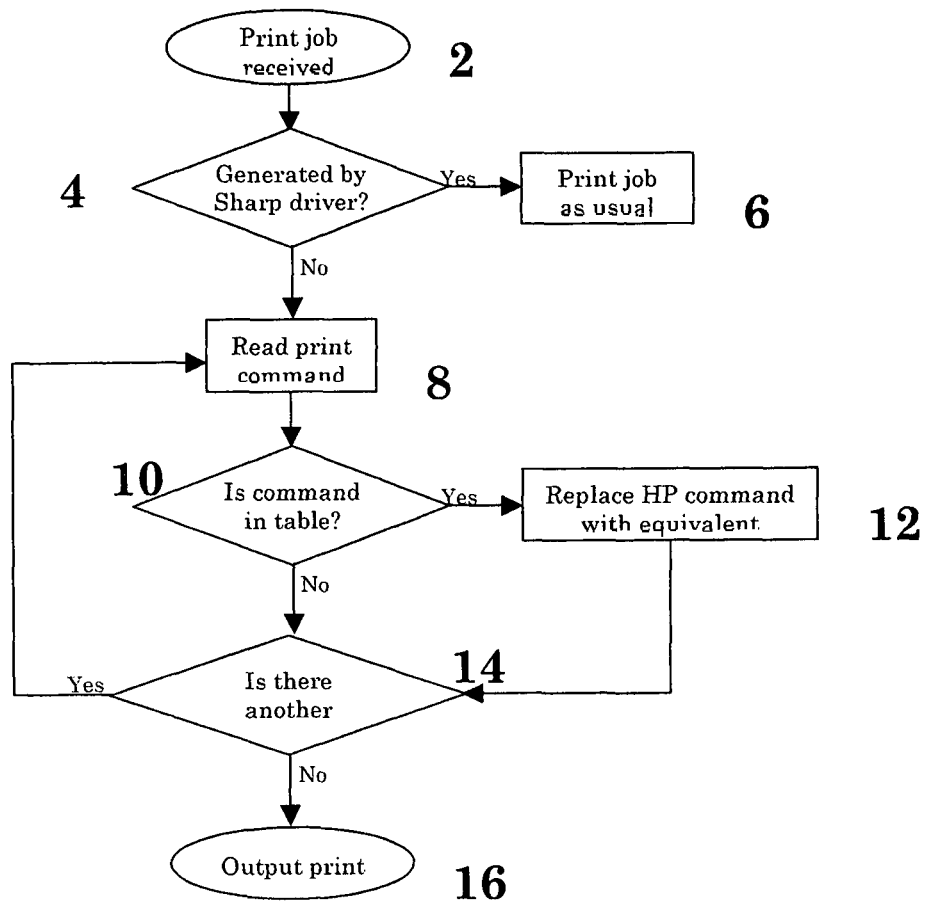
FIG. 4 is a flowchart illustrating the steps taken by the printer firmware to process an incoming print job using the present invention.

FIG. 4 is a flowchart illustrating the steps taken by the printer firmware to process an incoming print job using the present invention. In Step 2 a printer receives a print job. In Step 4 the printer then determines if the print job is generated by a Sharp driver. It is assumed that the printer is a Sharp printer. This determination is made by analyzing PJL commands in the data stream. If the job was generated by a Sharp driver, it is output using standard methods (Step 6). If the job was not generated by a Sharp driver, a first print command is read (Step 8). The printer then looks for this command in the table (Step 10) and if it is listed, replaces it with the Sharp command (Step 12). If the command is not listed in the mapping table, the print stream will be left as is. The printer then determines if there are additional commands in the print job (Step 14) and if so, repeats Steps 8-14. When all commands have been processed, the print job is released to the next stage of processing (Step 16).

In other aspect of the invention, multiple tables may be created for different printer models or manufacturers. Also, tables may be programmed by the user, rather than shipped with the printer firmware.

Figure 5:
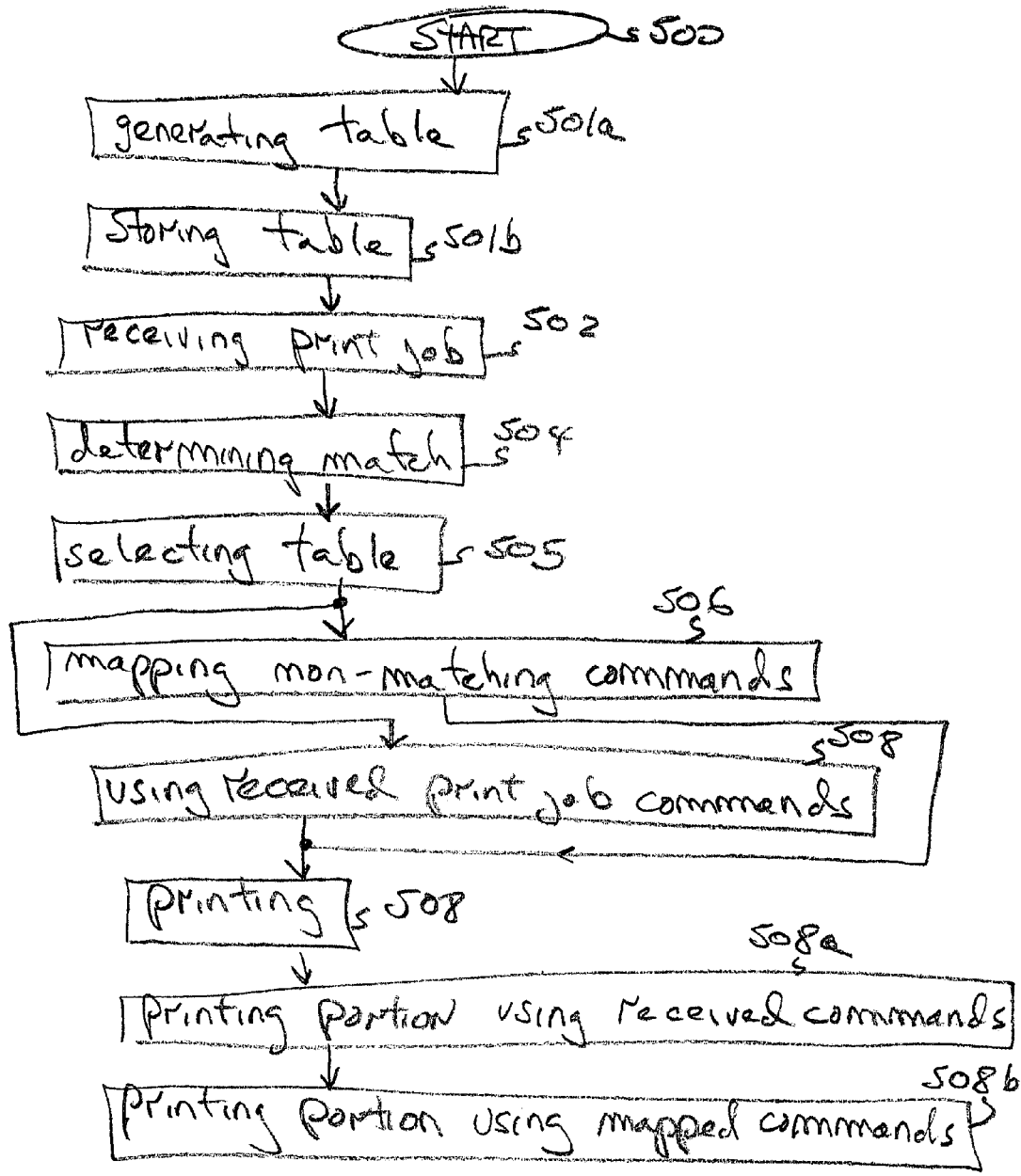
FIG. 5 is a flowchart illustrating the present invention method for selectively emulating printer job processes.

FIG. 5 is a flowchart illustrating the present invention method for selectively emulating printer job processes. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 receives an electronically formatted print job from a source. Step 504 determines a match between received print job commands and default print job commands. Step 506 maps non-matching received print job commands to default print job commands. Step 508 prints the print job using a modified set of received print job commands. Step 508 may print the print job using a combination of mapped default and received print job commands.

In one aspect, receiving an electronically formatted print job in Step 502 includes receiving a print job with commands such as PDL or PJL commands. Then, printing the print job using a combination of mapped default and received print job commands in Step 508 includes substeps. Step 508a prints a first portion of the print job using received print job commands. Step 508b prints a second portion of the print job using mapped default print job commands.

In one aspect, determining the match between received print job commands and default print job commands in Step 504 includes determining a source print driver identity. The method may comprise a further step. Step 505 selects a table in response to determining the source print driver identity. Then, mapping non-matching received print job commands to default print job commands in Step 506 includes accessing the selected table for default print job commands that have been cross-referenced to received print job commands.

In a different aspect, determining the source print driver identity (Step 504) includes identifying a source print driver in response to parsing PJL commands included with received print job commands. For example, Step 504 may parse a PJL command that identifies a first print driver and Step 505 selects a first table corresponding to the first print driver.

Parsing a PJL command that identifies a first print driver (Step 504) may include parsing a manufacturer-specific identifier in the received PJL commands. Alternately, a model-specific identifier may be parsed from the PJL commands.

In another aspect Step 504 parses a PJL command that identifies a first print driver from among a plurality of print drivers. Then, Step 505 selects a first table from among a plurality of tables corresponding to the plurality of print drivers. In a different aspect, Step 504 fails to parse a PJL command that identifies a particular print driver and Step 505 selects a second table in response to failing to identify a particular print driver. That is, an assumption is made as to the identity of the print driver in response to not finding a PJL command identifier.

In a different aspect Step 504 parses a PJL command that identifies a third print driver. Then, the method further comprises Step 507. Step 507 uses only the received print job commands in response to identifying the third print driver. That is, the third print driver is a driver specifically designed to work with the printer, so that it is not necessary to modify the print commands.

Mapping non-matching received print job commands to default print job commands in Step 506 includes mapping commands such as input tray number selection, output tray number selection, finishing options, such as whether the output is stapled, punched, bound along an edge, or bound as a pamphlet. Other commands involve whether the output is to be generated as an insert, as a transparency or in a carbon copy function, or delivered after a print hold, such as a requirement for the submission of a PIN or other proof, before the document is printed.

In one aspect, the method comprises additional steps. Step 501a generates a table that cross-references print job commands associated with a first source print driver, to default print job commands. Step 501b stores the generated table in an accessible printer memory. In one aspect, Step 501b includes replacing a table, previously stored in memory, with the generated table.

A printer emulation system and method have been provided. A few examples have been given to clarify the invention, which detail particular situations for when the invention might be used. Other examples describe particular commands or categories of commands that might be mapped. The invention, however, is not limited to just these examples. Other variations and embodiments of the invention will occur to those skilled in the art.

We claim:

1. A method for selectively emulating printer job processes, the method comprising:
   receiving a print job from a source, formatted in a protocol selected from a group consisting of a page description language (PDL) and a print job language (PJL), and including print job commands defined with respect to a first version of the print job protocol;
   determining a match between received print job commands defined with respect to the first version of the print job protocol and default print job commands defined with respect to a second version of the print job protocol;
   mapping non-matching received print job commands defined with respect to the first version of the print job protocol to default print job commands defined with respect to the second version of the print job protocol; and,
   printing the print job using a combination of the mapped default print job commands and the default print job commands matching the received the received print job commands.

2. The method of claim 1 wherein printing the print job using the mapped default print job commands includes printing the print job using a set of print job commands modified from the received print job commands.

3. The method of claim 1 wherein printing the print job using a combination of mapped default and received print job commands includes:

printing a first portion of the print job using received print job commands; and, printing a second portion of the print job using mapped default print job commands.

4. The method of claim 1 wherein determining the match between received print job commands and default print job commands includes determining a source print driver identity.

5. The method of claim 4 further comprising:
selecting a table in response to determining the source print driver identity; and,
wherein mapping non-matching received print job commands to default print job commands includes accessing the selected table for default print job commands that have been cross-referenced to received print job commands.

6. The method of claim 5 wherein determining the source print driver identity includes identifying a source print driver in response to parsing PJL commands included with received print job commands.

7. The method of claim 6 wherein identifying a source print driver in response to parsing the PJL commands includes parsing a PJL command that identifies a first print driver; and,
wherein selecting a table in response to determining the source print driver identity includes selecting a first table corresponding to the first print driver.

8. The method of claim 7 wherein parsing a PJL command that identifies a first print driver includes parsing a manufacturer-specific identifier in the received PJL commands.

9. The method of claim 7 wherein parsing a PJL command that identifies a first print driver includes parsing a PJL command that identifies a first print driver from among a plurality of print drivers; and,
wherein selecting a first table corresponding to the first print driver includes selecting a first table from among a plurality of tables corresponding to the plurality of print drivers.

10. The method of claim 7 wherein identifying a print driver identity in response to parsing the PJL commands includes failing to parse a PJL command that identifies a particular print driver;
wherein selecting a table in response to determining the source print driver identity includes selecting a second table in response to failing to identify a particular print driver.

11. The method of claim 7 wherein parsing a PJL command that identifies a first print driver includes parsing a model-specific identifier in the received PJL commands.

12. The method of claim 6 wherein identifying a print driver in response to parsing the PJL commands includes parsing a PJL command that identifies a third print driver; and,
the method further comprising:
using only the received print job commands in response to identifying the third print driver.

13. The method of claim 1 wherein mapping non-matching received print job commands to default print job commands includes mapping commands selected from the group including input tray number selection, output tray number selection, finishing options (staple, punch, binding edge, pamphlet), inserts (for transparencies and carbon copy function), and print hold (for PIN and proof print).

14. The method of claim 1 further comprising:
generating a table that cross-references print job commands associated with a first source print driver, to default print job commands; and,
storing the generated table in an accessible printer memory.

15. The method of claim 14 wherein storing the generated table in an accessible printer memory includes replacing a table, previously stored in memory, with the generated table.

16. A printer job emulation system, the system comprising:
a print controller having an interface to receive a print job from a source, formatted in a protocol selected from a group consisting of a page description language (PDL) and a print job language (PJL), and including print job commands defined with respect to a first version of the print job protocol, the controller determining a match between received print job commands defined with respect to the first version of the print job protocol and default print job commands defined with respect to a second version of the print job protocol, mapping non-matching received print job commands defined with respect to the first version of the print job protocol to default print job commands defined with respect to the second version of the print job protocol, and supplying a combination of mapped default print job commands and the default print job commands matching the received the received print job commands at an output; and,
a print engine having an input to receive the combination of mapped default print job commands and the default print job commands matching the received the received print job commands, and an output to supply a printed document responsive to the mapped and matching default print job commands.

17. The system of claim 16 wherein the print controller has an output to supply a set of print job commands modified from the received print job commands; and,
wherein the print engine receives the modified print job commands and supplies a printed document responsive to the modified print job commands.

18. The system of claim 16 wherein the print engine prints a first portion of the print job using received print job commands, and a second portion of the print job using mapped default print job commands.

19. The system of claim 18 wherein the print controller determines the match between received print job commands and default print job commands in response to identifying a source print driver.

20. The system of claim 19 wherein the print controller identifies a source print driver in response to parsing a print driver source command in the received PJL commands.

21. The system of claim 20 further comprising:
an accessible memory including at least one table cross-referencing received print job commands to default print job commands; and,
wherein the print controller selects a table in response to determining the source print driver identity, and maps non-matching received print job commands to default print job commands in response to accessing the selected table.

22. The system of claim 21 wherein the print controller parses a PJL command that identifies a first print driver and selects a first table from the memory corresponding to the first print driver.

23. The system of claim 22 wherein the print controller identifies the first print driver by parsing a manufacturer-specific identifier in the received PJL commands.

24. The system of claim 22 wherein the memory includes a plurality of tables corresponding to a plurality of print drivers; and,
wherein the print controller parses a PJL command that identifies a first print driver from among a plurality of print drivers, and selects a first table in memory, corresponding to the first print driver, from among the plurality of tables.

25. The system of claim 22 wherein the print controller fails to parse a PJL command that identifies a particular print driver, and selects a second table from memory in response to failing to identify a particular print driver.

26. The system of claim 22 wherein the print controller parses a PJL command that identifies a third print driver and supplies unmodified received print job commands to the print engine in response to identifying the third print driver.

27. The system of claim 22 wherein the print controller identifies the first print driver by parsing a model-specific identifier in the received PJL commands.

28. The system of claim 16 wherein the print controller maps print job commands selected from the group including input tray number selection, output tray number selection, finishing options (staple, punch, binding edge, pamphlet), inserts (for transparencies and carbon copy function), and print hold (for PIN and proof print).

29. The system of claim 16 wherein the memory has an interface for accepting and storing a generated table that cross-references print job commands associated with a first source print driver, to default print job commands.

30. The system of claim 29 wherein the memory replaces a previously stored table with the accepted table.

* * * * *